United States Patent
El-Kattan et al.

(10) Patent No.: US 12,503,443 B2
(45) Date of Patent: Dec. 23, 2025

(54) PROCESS-SCALE SYNTHESIS OF A PLASMA KALLIKREIN INHIBITOR

(71) Applicant: BioCryst Pharmaceuticals, Inc., Durham, NC (US)

(72) Inventors: Yahya El-Kattan, Vestavia Hills, AL (US); Yarlagadda S. Babu, Birmingham, AL (US)

(73) Assignee: BioCryst Pharmaceuticals, Inc., Durham, NC (US)

( * ) Notice: Subject to any disclaimer, the term of this patent is extended or adjusted under 35 U.S.C. 154(b) by 992 days.

(21) Appl. No.: 17/632,585

(22) PCT Filed: Aug. 5, 2020

(86) PCT No.: PCT/US2020/044921
§ 371 (c)(1),
(2) Date: Feb. 3, 2022

(87) PCT Pub. No.: WO2021/026182
PCT Pub. Date: Feb. 11, 2021

(65) Prior Publication Data
US 2022/0289683 A1    Sep. 15, 2022

Related U.S. Application Data

(60) Provisional application No. 62/883,396, filed on Aug. 6, 2019.

(51) Int. Cl.
*C07D 231/14* (2006.01)
(52) U.S. Cl.
CPC .................... *C07D 231/14* (2013.01)
(58) Field of Classification Search
CPC .................................. C07D 231/14
See application file for complete search history.

(56) References Cited

U.S. PATENT DOCUMENTS

| | | |
|---|---|---|
| 2004/0171649 A1 | 9/2004 | Annis et al. |
| 2010/0256195 A1 | 10/2010 | Fischer et al. |
| 2018/0354906 A1 | 12/2018 | Kotian et al. |
| 2022/0289683 A1 | 9/2022 | El-Kattan et al. |

FOREIGN PATENT DOCUMENTS

| | | |
|---|---|---|
| WO | WO-2010/069502 A2 | 6/2010 |
| WO | WO-2014/062838 A2 | 4/2014 |
| WO | WO-2015/134998 A1 | 9/2015 |
| WO | WO-2021/026182 A1 | 2/2021 |

OTHER PUBLICATIONS

Dunetz, J.R. et al., "General and Scalable Amide Bond Formation with Epimerization-Prone Substrates Using T3P and Pyridine." Organic Letters, vol. 13, No. 19, pp. 5048-5051 (2011).
International Preliminary Report on Patentability for International Application No. PCT/US2020/044921 dated Feb. 8, 2022.
International Search Report and Written Opinion for International Application No. PCT/US20/44921 mailed Nov. 4, 2020.
Sharnabai et al., "Efficient Synthesis of N-protected Amino/Peptide Weinreb Amides from T3P and DBU," Tetrahedron Letters, 54: 478-482 (2013).
Extended European Search Report for EP Application No. 20850499.3 dated Jul. 17, 2023.
Belwal et al., "Development and scale up of a chemical process in pharmaceutical industry: A case study", International Journal of Engineering Research and Application, Jul. 2016, 6(7): pp. 81-88.
Dunetz et al., "Large-scale applications of amide coupling reagents for the synthesis of pharmaceuticals", Organic Process Research & Development 20.2 (2016): 140-177.
Xu et al., "Discovery of 3-(trifluoromethyl)-1H-pyrazole-5-carboxamide activators of the M2 isoform of pyruvate kinase (PKM2)." Bioorganic & Medicinal Chemistry Letters 24 (2014): 515-519.

*Primary Examiner* — Alicia L Otton
(74) *Attorney, Agent, or Firm* — Foley Hoag LLP; Dana M. Gordon; Laura A. Wzorek

(57) ABSTRACT

Disclosed are methods of preparing Compound I, and salts thereof. The methods of preparing Compound I are suitable for use on process scale.

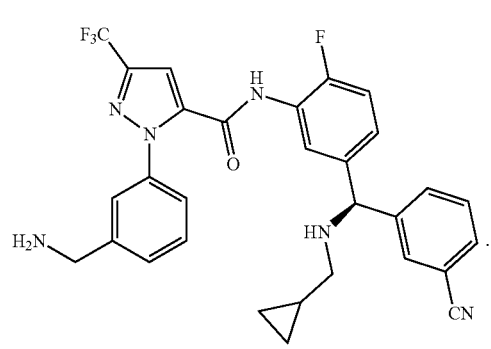

22 Claims, No Drawings

PROCESS-SCALE SYNTHESIS OF A PLASMA KALLIKREIN INHIBITOR

RELATED APPLICATIONS

This application is a U.S. National Stage Application of International Application No. PCT/US20/44921, filed Aug. 5, 2020; which claims the benefit of priority to U.S. Provisional Patent Application Ser. No. 62/883,396, filed Aug. 6, 2019.

BACKGROUND

Serine proteases make up the largest and most extensively studied group of proteolytic enzymes. Their critical roles in physiological processes extend over such diverse areas as blood coagulation, fibrinolysis, complement activation, reproduction, digestion, and the release of physiologically active peptides. Many of these vital processes begin with cleavage of a single peptide bond or a few peptide bonds in precursor protein or peptides. Sequential limited proteolytic reactions or cascades are involved in blood clotting, fibrinolysis, and complement activation. The biological signals to start these cascades can be controlled and amplified as well. Similarly, controlled proteolysis can shut down or inactivate proteins or peptides through cleavage of a single bond.

Kallikreins are a subgroup of serine proteases. In humans, plasma kallikrein (KLKB1) has no known homologue, while tissue kallikrein-related peptidases (KLKs) encode a family of fifteen closely related serine proteases. Plasma kallikrein participates in a number of pathways relating to the intrinsic pathway of coagulation, inflammation, and the complement system.

Coagulation is the process by which blood forms clots, for example to stop bleeding. The physiology of coagulation is somewhat complex insofar as it includes two separate initial pathways, which converge into a final common pathway leading to clot formation. In the final common pathway, prothrombin is converted into thrombin, which in turn converts fibrinogen into fibrin, the latter being the principal building block of cross-linked fibrin polymers which form a hemostatic plug. Of the two initial pathways upstream of the final common pathway, one is known as the contact activation or intrinsic pathway, and the other is known as the tissue factor or extrinsic pathway.

The intrinsic pathway begins with formation of a primary complex on collagen by high-molecular-weight kininogen (HMWK), prekallikrein, and FXII (Factor XII; Hageman factor). Prekallikrein is converted to kallikrein, and FXII is activated to become FXIIa. FXIIa then converts Factor XI (FXI) into FXIa, and FXIa in turn activates Factor IX (FIX), which with its co-factor FVIIIa form the "tenase" complex, which activates Factor X (FX) to FXa. It is FXa which is responsible for the conversion of prothrombin into thrombin within the final common pathway.

Prekallikrein, the inactive precursor of plasma kallikrein, is synthesized in the liver and circulates in the plasma bound to HMWK or as a free zymogen. Prekallikrein is cleaved by activated factor XII(FXIIa) to release activated plasma kallikrein (PK). Activated plasma kallikrein displays endopeptidase activity towards peptide bonds after arginine (preferred) and lysine. PK then generates additional FXIIa in a feedback loop which in turn activates factor XI (FXI) to FXIa to connect to the common pathway. Although the initial activation of the intrinsic pathway is through a small amount of FXIIa activating a small amount of PK, it is the subsequent feedback activation of FXII by PK that controls the extent of activation of the intrinsic pathway and hence downstream coagulation. Hathaway, W. E., et al. (1965) Blood 26:521-32.

Activated plasma kallikrein also cleaves HMWK to release the potent vasodilator peptide bradykinin. It is also able to cleave a number of inactive precursor proteins to generate active products, such as plasmin (from plasminogen) and urokinase (from prourokinase). Plasmin, a regulator of coagulation, proteolytically cleaves fibrin into fibrin degradation products that inhibit excessive fibrin formation.

Patients who have suffered acute myocardial infarction (MI) show clinical evidence of being in a hypercoagulable (clot-promoting) state. This hypercoagulability is paradoxically additionally aggravated in those receiving fibrinolytic therapy. Increased generation of thrombin, as measured by thrombin-antithrombin III (TAT) levels, is observed in patients undergoing such treatment compared to the already high levels observed in those receiving heparin alone. Hoffmeister, H. M. et al. (1998) Circulation 98:2527-33. The increase in thrombin has been proposed to result from plasmin-mediated activation of the intrinsic pathway by direct activation of FXII by plasmin.

Not only does the fibrinolysis-induced hypercoagulability lead to increased rates of reocclusion, but it is also probably responsible, at least in part, for failure to achieve complete fibrinolysis of the clot (thrombus), a major shortcoming of fibrinolytic therapy (Keeley, E. C. et al. (2003) Lancet 361: 13-20). Another problem in fibrinolytic therapy is the accompanying elevated risk of intracranial hemorrhage. Menon, V. et al. (2004) (Chest 126:549S-575S; Fibrinolytic Therapy Trialists' Collaborative Group (1994) Lancet 343: 311-22. Hence, an adjunctive anti-coagulant therapy that does not increase the risk of bleeding, but inhibits the formation of new thrombin, would be greatly beneficial.

Plasma kallikrein inhibitors also have therapeutic potential for treating hereditary angioedema (HAE). HAE is a serious and potentially life-threatening rare genetic illness, caused by mutations in the C1-esterase inhibitor (C1INH) gene, which is located on chromosome 11q. HAE is inherited as an autosomal dominant condition, although one quarter of diagnosed cases arise from a new mutation. HAE has been classed as an orphan disease in Europe, with an estimated prevalence of 1 in 50,000. Individuals with HAE experience recurrent acute attacks of painful subcutaneous or submucosal edema of the face, larynx, gastrointestinal tract, limbs or genitalia which, if untreated, may last up to 5 days. Attacks vary in frequency, severity and location and can be life-threatening. Laryngeal attacks, with the potential for asphyxiation, pose the greatest risk. Abdominal attacks are especially painful, and often result in exploratory procedures or unnecessary surgery. Facial and peripheral attacks are disfiguring and debilitating.

HAE has a number of subtypes. HAE type I is defined by C1INH gene mutations which produce low levels of C1-inhibitor, whereas HAE type II is defined by mutations which produce normal levels of ineffective C1 protein. HAE type III has separate pathogenesis, being caused by mutations in the F12 gene which codes for the serine protease known as Factor XII. Diagnostic criteria for distinguishing the subtypes of HAE, and distinguishing HAE from other angioedemas, can be found in *Ann Allergy Asthma Immunol* 2008; 100(Suppl2): S30-S40 and *J Allergy Clin Immunol* 2004; 114: 629-37, incorporated herein by reference.

Current treatments for HAE fall into two main types. Older non-specific treatments including androgens and antifibrinolytics are associated with significant side effects, particularly in females. Newer treatments are based on an understanding of the molecular pathology of the disease, namely that C1INH is the most important inhibitor of kallikrein in human plasma and that C1INH deficiency leads to unopposed activation of the kallikrein-bradykinin cascade, with bradykinin the most important mediator of the locally increased vascular permeability that is the hallmark of an attack. All of the currently available targeted therapies are administered by intravenous or subcutaneous injection. There is currently no specific targeted oral chronic therapy for HAE.

Therefore, a need exists to develop inhibitors of PK that can tip the balance of fibrinolysis/thrombosis at the occluding thrombus toward dissolution, thereby promoting reperfusion and also attenuating the hypercoagulable state, thus preventing thrombus from reforming and reoccluding the vessel. In particular, the creation of plasma kallikrein inhibitors that are specific and capable of being formulated for in vivo use could lead to a new class of therapeutics. Thus, what is needed are improved methods for preparing and formulating plasma kallikrein inhibitors, particularly on a process-scale.

SUMMARY OF THE INVENTION

One aspect of the invention relates to a synthesis of Compound I or a salt thereof that is capable of being executed on process-scale (e.g., to produce about 100 kilograms of Compound I or a salt thereof);

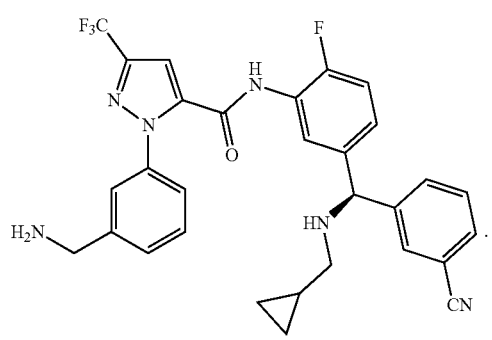

I

In certain aspects, the invention provides a method, comprising the step of combining compound C, or a salt thereof, and compound F, or a salt thereof, under conditions sufficient to produce compound D, or a salt thereof, wherein:

compound C is represented by:

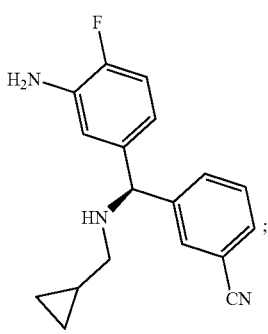 [SMILES: N#Cc1cccc([C@@H](NCC2CC2)c2ccc(F)c(N)c2)c1]

compound F is represented by:

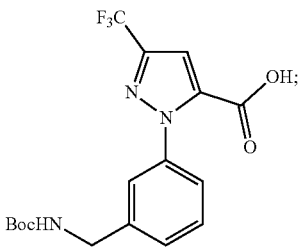 [SMILES: CC(C)(C)OC(=O)NCc1cccc(-n2nc(C(F)(F)F)cc2C(=O)O)c1]

and compound D is represented by:

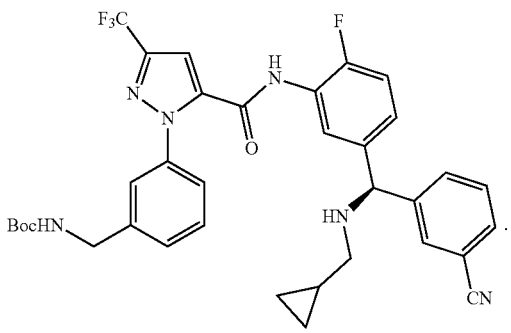

In certain aspects, the method further comprises (a) combining compound B, or a salt thereof, and

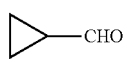

to form a first reaction mixture, then (b) combining the first reaction mixture with a reducing agent under conditions sufficient to form compound C, or a salt thereof, wherein:

compound B is represented by:

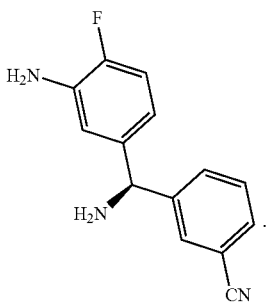 [SMILES: N#Cc1cccc([C@@H](N)c2ccc(F)c(N)c2)c1]

In certain aspects, the method further comprises (a) combining compound A and a second acid under conditions sufficient to form compound B, or a salt thereof, wherein:

compound A is represented by:

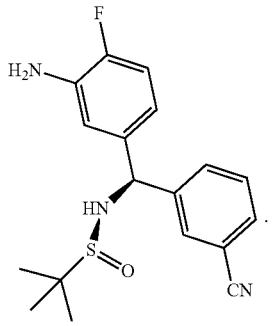

In certain aspects, the method further comprises (c) combining compound D and a deprotecting reagent to form a second reaction mixture, then (d) exposing the second reaction mixture to conditions sufficient to form Compound I as a free base.

In certain aspects, the method further comprises e) providing a first freebase mixture of Compound I as a free base in a fourth organic solvent; f) combining the freebase mixture with a first reagent solution comprising a fourth acid and a fifth organic solvent under conditions sufficient to form a third reaction mixture comprising a salt of Compound I; and g) crystallizing the salt of Compound I from the mixture comprising a salt of Compound I.

DETAILED DESCRIPTION OF THE INVENTION

The present invention relates to the synthesis of Compound I that is capable of being executed on process-scale (e.g., to produce about 100 kilograms of Compound I).

Methods of Making Compound I

In certain embodiments, the invention relates to a method, comprising the step of combining compound C, or a salt thereof, and compound F, or a salt thereof, under conditions sufficient to produce compound D, or a salt thereof, wherein:

compound C is represented by:

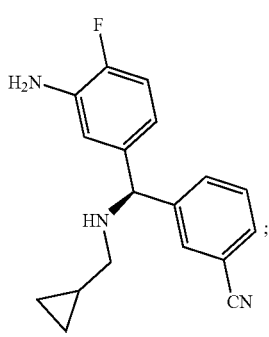 [SMILES: N#Cc1cccc([C@@H](NCC2CC2)c2ccc(F)c(N)c2)c1]

compound F is represented by:

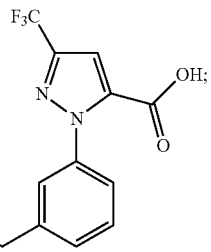

compound D is represented by:

In certain embodiments, the conditions sufficient to produce compound D comprise an amide-coupling reagent and a first base.

In certain embodiments, the amide-coupling reagent is propylphosphonic anhydride (T3P), N,N'-di(isopropyl)carbodiimide, N,N'-di(cyclohexyl)carbodiimide, 1-ethyl-3-(3-dimethylaminopropyl)carbodiimide, or ethyl 2-cyano-2-(hydroxyimino)acetate; preferably the amide-coupling reagent is propylphosphonic anhydride (T3P).

In certain embodiments, the first base is a first organic base. Exemplary organic bases include amine bases and alkoxide bases. In certain embodiments, the first base is triethylamine, pyridine, diisopropylethylamine, diisopropylmethylamine, imidazole, pyrimidine, N-methylmorpholine, quinuclidine, or 1,4-diazabicyclo[2.2.2]octane (DABCO). In preferred embodiments, the first base is pyridine.

In certain embodiments, the conditions sufficient to produce compound D further comprise a first solvent. The first solvent may be a polar aprotic solvent, such as dichloromethane, tetrahydrofuran, acetone, acetonitrile, or ethyl acetate. In preferred embodiments, the first solvent is ethyl acetate.

In certain embodiments, compound C is present as an acid salt; and
the method further comprises the step of combining the acid salt of compound C with a second aqueous base, thereby forming the free base of compound C;
wherein the step of combining the acid salt of compound C with a second aqueous base occurs before combining compound C and compound F.

In certain embodiments, an "acid salt" means a salt that is formed in the presence of a Bronsted acid. For example, an amine such as R—NH$_2$ is readily protonated by a Bronsted acid H—X to form R—NH$_3^+$ X$^-$. Thus, R—NH$_3^+$ X$^-$ is the acid salt of R—NH$_2$. Common Bronsted acids that may cause formation of an acid salt include hydrochloric acid, hydrobromic acid, hydroiodic acid, and oxalic acid. When they contact an amine, such Bronsted acids can cause formation of hydrochloride salts, hydrobromide salts, hydroiodide salts, or oxalic acid salts, respectively.

In certain embodiments, the acid salt of compound C is a hydrochloride salt, a hydrobromide salt, a hydroiodide salt, or an oxalic acid salt. Preferably, the acid salt of compound C is an oxalic acid salt.

In certain embodiments, the second aqueous base comprises potassium hydroxide, sodium hydroxide, ammonium hydroxide, potassium bicarbonate, sodium bicarbonate, potassium carbonate, or sodium carbonate. In preferred embodiments, the second aqueous base comprises potassium hydroxide.

In certain embodiments, the method further comprises (a) combining compound B, or a salt thereof, and

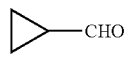

to form a first reaction mixture, then (b) combining the first reaction mixture with a reducing agent under conditions sufficient to form compound C, or a salt thereof, wherein: compound B is represented by:

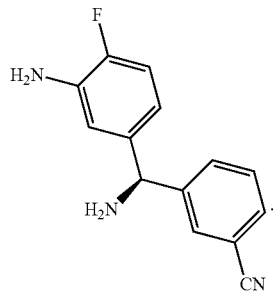 [SMILES: N#Cc1cccc([C@@H](N)c2ccc(F)c(N)c2)c1]

In certain embodiments, the reducing agent is $LiAlH_4$ or $NaBH_4$, preferably $NaBH_4$.

In certain embodiments, the conditions sufficient to produce compound C further comprise a second solvent.

In certain embodiments, the second solvent is a second polar protic solvent. Exemplary polar protic solvents include methanol, ethanol, and isopropanol. In certain embodiments, the second solvent is methanol.

In certain embodiments, the method further comprises contacting compound C with a first acid to form an acid salt of compound C.

In certain such embodiments, the first acid is hydrochloric acid, hydrobromic acid, hydroiodic acid, or oxalic acid; and the acid salt of compound C is a hydrochloride salt, a hydrobromide salt, a hydroiodide salt, or an oxalic acid salt. In preferred embodiments, the first acid is oxalic acid and the acid salt of compound C is an oxalic acid salt.

In certain embodiments, compound B is present as an acid salt; and
the method further comprises the step of combining the salt of compound B with a third organic base, thereby forming the free base of compound B;
wherein the step of combining the salt of compound B with a third organic base occurs before combining compound B and

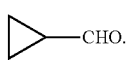

In certain such embodiments, the acid salt of compound B is a hydrochloride salt, a hydrobromide salt, or a hydroiodide salt. Preferably, the acid salt of compound B is a hydrochloride salt.

In certain embodiments, the third organic base comprises sodium methoxide.

In certain embodiments, the method further comprises (a) combining compound A and a second acid under conditions sufficient to form compound B, or a salt thereof, wherein: compound A is represented by:

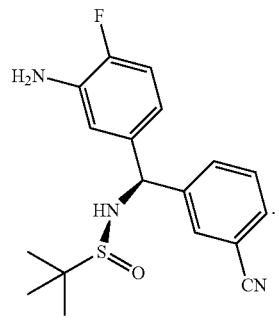

In certain embodiments, the second acid is hydrochloric acid, hydrobromic acid, or hydroiodic acid, preferably hydrochloric acid.

In certain embodiments, the conditions sufficient to form compound B comprise a third polar protic solvent. Exemplary polar protic solvents include methanol, ethanol, and isopropanol. In preferred embodiments, the third polar protic solvent is isopropanol.

In certain embodiments, compound B is formed as an acid salt, such as the hydrochloride salt, hydrobromide salt, or hydroiodide salt. In preferred embodiments, the acid salt of compound B is a hydrochloride salt.

In certain embodiments, the method further comprises (c) combining compound D and a deprotecting reagent to form a second reaction mixture, then (d) exposing the second reaction mixture to conditions sufficient to form Compound I as a free base; wherein:
Compound I is represented by:

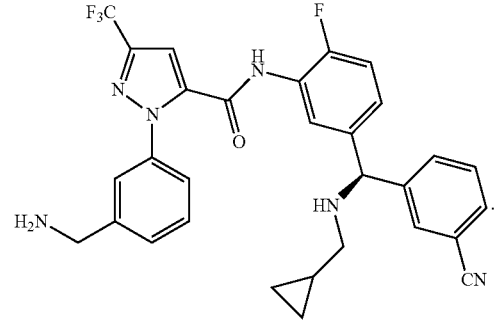 [SMILES: N#Cc1cccc([C@@H](NCC2CC2)c2ccc(F)c(NC(=O)c3cc(C(F)(F)F)nn3-c3cccc(CN)c3)c2)c1]

In certain embodiments, the deprotecting reagent is a third acid. Exemplary acids include hydrochloric acid, hydrobromic acid, and hydroiodic acid. In preferred embodiments, the third acid is hydrochloric acid.

In certain embodiments, the conditions sufficient to form Compound I as a free base comprise a fourth base. In certain embodiments, the fourth base is aqueous ammonia.

In certain embodiments, the method further comprises:
e) providing a first freebase mixture of Compound I as a free base in a fourth organic solvent;
f) combining the freebase mixture with a first reagent solution comprising a fourth acid and a fifth organic solvent under conditions sufficient to form a third reaction mixture comprising a salt of Compound I; and
g) crystallizing the salt of Compound I from the mixture comprising a salt of Compound I.

In certain embodiments, the crystalline salt is a hydrochloride salt, e.g., a bis(hydrochloride) salt.

In certain embodiments, the fourth organic solvent comprises a fourth polar aprotic solvent. Exemplary polar aprotic solvents include acetonitrile, N,N-dimethylacetamide (DMA), dimethylformamide (DMF), dimethylsulfoxide (DMSO), diethyl ether, ethyl acetate, isopropyl acetate, methylethyl ketone, methyl tert-butyl ether (MTBE), N-methyl-2-pyrrolidone (NMP), tetrahydrofuran, dichloromethane, and acetone. In certain embodiments, the fourth polar aprotic solvent is methyl tert-butyl ether.

In certain embodiments, the fourth organic solvent further comprises a fourth non-polar solvent. Non-polar solvents include, for example, benzene, heptaine, hexanes, and toluene. In certain embodiments, the non-polar solvent is toluene.

In certain embodiments, the fourth acid is hydrochloric acid.

In certain embodiments, the fifth organic solvent is a fifth polar protic solvent, such as ethanol, methanol, 2-propanol, 1-butanol, water, or any combination thereof. Preferably, the fifth polar protic solvent is methanol.

In certain embodiments, compound C is used in an amount of at least 1 kg, at least 5 kg, at least 10 kg, at least 15 kg, at least 20 kg, at least 25 kg, at least 30 kg, at least 35 kg, at least 40 kg, at least 45 kg, at least 50 kg, at least 55 kg, or at least 60 kg. In further embodiments, compound C is used in an amount of at least 50 kg.

In certain embodiments, the method of the invention produces Compound I or a salt thereof on a scale of at least 1 kg, at least 5 kg, at least 10 kg, at least 15 kg, at least 20 kg, at least 25 kg, at least 30 kg, at least 35 kg, at least 40 kg, at least 45 kg, at least 50 kg, at least 55 kg, at least 60 kg, at least 65 kg, at least 70 kg, at least 75 kg, at least 80 kg, at least 85 kg, at least 90 kg, at least 95 kg, or at least 100 kg.

Pharmaceutical Compositions

Compound I, synthesized according to the methods described herein, may be formulated in a pharmaceutical composition. Such pharmaceutical compositions comprise Compound I and a pharmaceutically acceptable carrier.

The terms "carrier" and "pharmaceutically acceptable carrier" as used herein refer to a diluent, adjuvant, excipient, or vehicle with which a compound is administered or formulated for administration. Non-limiting examples of such pharmaceutically acceptable carriers include liquids, such as water, saline, and oils; and solids, such as gum acacia, gelatin, starch paste, talc, keratin, colloidal silica, urea, and the like. In addition, auxiliary, stabilizing, thickening, lubricating, flavoring, and coloring agents may be used. Other examples of suitable pharmaceutical carriers are described in *Remington's Pharmaceutical Sciences* by E. W. Martin, herein incorporated by reference in its entirety.

In certain embodiments, a pharmaceutical composition of the invention further comprises at least one additional pharmaceutically active agent other than Compound I. The at least one additional pharmaceutically active agent can be an agent useful in the treatment of a disease or condition characterized by aberrant plasma kallikrein activity. For example, the at least one additional pharmaceutically active agent can be an anticoagulation agent, an anti-platelet agent, or a thrombolytic agent.

Anticoagulation agents prevent the coagulation of blood components and thus prevent clot formation, for example in atrial fibrillation. Anticoagulants include, but are not limited to, heparin, warfarin, coumadin, dicumarol, phenprocoumon, acenocoumarol, ethyl biscoumacetate, hirudin, bivalarutin, direct thrombin inhibitors, and indandione derivatives.

Anti-platelet agents inhibit platelet aggregation and are often used to prevent thromboembolic stroke in patients who have experienced a transient ischemic attack, stroke, or atrial fibrillation. Anti-platelet agents include, but are not limited to, aspirin, thienopyridine derivatives such as ticlopodine and clopidogrel, dipyridamole, and sulfinpyrazone, as well as RGD mimetics.

Thrombolytic agents lyse clots that cause thromboembolic phenomena such as stroke, myocardial infarction, and pulmonary thromboembolism. Thrombolytic agents include, but are not limited to, plasminogen, a2-antiplasmin, streptokinase, antistreplase, TNK, tissue plasminogen activator (tPA), and urokinase. Tissue plasminogen activator includes native tPA and recombinant tPA, as well as modified forms of tPA that retain the enzymatic or fibrinolytic activities of native tPA.

Pharmaceutical compositions of the invention can be prepared by combining Compound I with a pharmaceutically acceptable carrier and, optionally, one or more additional pharmaceutically active agents.

In certain embodiments, the invention provides a pharmaceutical composition that is formulated for the prophylactic or therapeutic treatment of a disease or condition characterized by aberrant plasma kallikrein activity.

Therapeutic Methods

The present invention provides methods of making compounds that inhibit the formation of thrombin via the intrinsic pathway and thus reduce the risk of new pathogenic thrombus formation (vessel occlusion or reocclusion) and also improve fibrinolytic-induced reperfusion when given as adjunctive therapy with a fibrinolytic regimen. Diseases and conditions that can be treated using the compounds of the present invention include, but are not limited to, stroke, inflammation, reperfusion injury, acute myocardial infarction, deep vein thrombosis, post fibrinolytic treatment condition, angina, edema, angioedema, hereditary angioedema, sepsis, arthritis, hemorrhage, blood loss during cardiopulmonary bypass, inflammatory bowel disease, diabetes mellitus, retinopathy, diabetic retinopathy, diabetic macular edema, diabetic macular degeneration, age-related macular edema, age-related macular degeneration, proliferative retinopathy, neuropathy, hypertension, brain edema, increased albumin excretion, macroalbuminuria, and nephropathy.

For example, in patients with angioedema conditions, small polypeptide PK inhibitor DX-88 (ecallantide) alleviates edema in patients with hereditary angioedema (HAE). Williams, A. et al. (2003) *Transfus. Apher. Sci.* 29:255-8; Schneider, L. et al. (2007) *J Allergy Clin Immunol.* 120:416-22; and Levy, J. H. et al. (2006) *Expert Opin. Invest. Drugs* 15:1077-90. A bradykinin B2 receptor antagonist, Icatibant, is also effective in treating HAE. Bork, K. et al. (2007) *J. Allergy Clin. Immunol.* 119:1497-1503. Because plasma kallikrein generates bradykinin, inhibition of plasma kallikrein is expected to inhibit bradykinin production.

For example, in coagulation resulting from fibrinolytic treatment (e.g., treatment with tissue plasminogen activator or streptokinase), higher levels of plasma kallikrein are found in patients undergoing fibrinolysis. Hoffmeister, H. M. et al. (1998) *J. Cardiovasc. Pharmacol.* 31:764-72. Plasmin-mediated activation of the intrinsic pathway has been shown to occur in plasma and blood and was markedly attenuated in plasma from individuals deficient in any of the intrinsic pathway components. Ewald, G. A. et al. (1995) *Circulation* 91:28-36.

Individuals who have had an acute MI were found to have elevated levels of activated plasma kallikrein and thrombin. Hoffmeister, H. M., et al. (1998) *Circulation* 98:2527-33.

DX-88 reduced brain edema, infarct volume, and neurological deficits in an animal model of ischemic stroke. Storini, C. et al. (2006) *J. Pharm. Exp. Ther.* 318:849-854. C1-inhibitor reduced infarct size in a mouse model of middle cerebral artery occlusion (MCAO). De Simoni, M. G. et al. (2004) *Am. J. Pathol.* 164:1857-1863; and Akita, N. et al. (2003) *Neurosurgery* 52:395-400). B2 receptor antagonists were found to reduce the infarct volume, brain swelling, and neutrophil accumulation and were neuroprotective in an MCAO animal model. Zausinger, S. et al. (2003) *Acta Neurochir.* Suppl. 86:205-7; Lumenta, D. B. et al. (2006) *Brain Res.* 1069:227-34; Ding-Zhou, L. et al. (2003) *Br. J Pharmacol.* 139:1539-47.

Regarding blood loss during cardiopulmonary bypass (CPB), it has been found that the kallikrein-kinin (i.e., contact) system is activated during CABG. Wachtfogel, Y. T. (1989) *Blood* 73:468. Activation of the contact system during CPB results in up to a 20-fold increase in plasma bradykinin. Cugno, M. et al. (2006) *Chest* 120:1776-82; and Campbell, D. J. et al. (2001) Am. *J. Physiol. Reg. Integr. Comp. Physiol.* 281:1059-70.

Plasma kallikrein inhibitors P8720 and PKSI-527 have also been found to reduce joint swelling in rat models of arthritis. De La Cadena, R. A. et al. (1995) *FASEB J.* 9:446-52; Fujimori, Y. (1993) *Agents Action* 39:42-8. It has also been found that inflammation in animal models of arthritis was accompanied by activation of the contact system. Blais, C. Jr. et al. (1997) *Arthritis Rheum.* 40:1327-33.

Additionally, plasma kallikrein inhibitor P8720 has been found to reduce inflammation in an acute and chronic rat model of inflammatory bowel disease (IBD). Stadnicki, A. et al. (1998) *FASEB J.* 12:325-33; Stadnicki, A. et al. (1996) *Dig. Dis. Sci.* 41:912-20; and De La Cadena, R. A., et al. (1995) *FASEB J* 9:446-52. The contact system is activated during acute and chronic intestinal inflammation. Sartor, R. B. et al. (1996) *Gastroenterology* 110:1467-81. It has been found that B2 receptor antagonist, an antibody to high molecular weight kininogen, or reduction in levels of kininogen reduced clinicopathology in animal models of IBD. Ibid; Arai, Y. et al. (1999) *Dig. Dis. Sci.* 44:845-51; and Keith, J. C. et al. (2005) *Arthritis Res. Therapy* 7:R769-76.

H-D-Pro-Phe-Arg-chloromethylketone (CMK), an inhibitor of PK and FXII and a physiological inhibitor (C1-inhibitor), has been found to reduce vascular permeability in multiple organs and reduce lesions in lipopolysaccharide (LPS)- or bacterial-induced sepsis in animals. Liu, D. et al. (2005) *Blood* 105:2350-5; Persson, K. et al. (2000) *J. Exp. Med* 192:1415-24. Clinical improvement was observed in sepsis patients treated with C1-inhibitor. Zeerleder, S. et al. (2003) *Clin. Diagnost. Lab. Immunol.* 10:529-35; Caliezi, C., et al. (2002) *Crit. Care Med* 30:1722-8; and Marx, G. et al. (1999) *Intensive Care Med* 25:1017-20. Fatal cases of septicemia are found to have a higher degree of contact activation. Martinez-Brotons, F. et al. (1987) *Thromb. Haemost.* 58:709-713; and Kalter, E. S. et al. (1985) *J. Infect. Dis.* 151:1019-27.

It has also been found that prePK levels are higher in diabetics, especially those with proliferative retinopathy, and correlate with fructosamine levels. Gao, B.-B., et al. (2007) *Nature Med* 13:181-8; and Kedzierska, K. et al. (2005) *Archives Med Res.* 36:539-43. PrePK is also found to be highest in those with a sensorimotor neuropathy. Christie, M. et al. (1984) Thromb. Haemostas. (Stuttgart) 52:221-3. PrePK levels are elevated in diabetics and are associated with increased blood pressure. PrePK levels independently correlate with the albumin excretion rate and are elevated in diabetics with macroalbuminuria, suggesting prePK may be a marker for progressive nephropathy. Jaffa, A. A. et al. (2003) *Diabetes* 52:1215-21. B1 receptor antagonists have been found to decrease plasma leakage in rats treated with streptozotocin. Lawson, S. R. et al. (2005) *Eur. J. Pharmacol.* 514:69-78. B1 receptor antagonists can also prevent streptozotocin-treated mice from developing hyperglycemia and renal dysfunction. Zuccollo, A. et al. (1996) *Can. J Physiol. Pharmacol.* 74:586-9.

Compound I may be used as a medicament.

For example, Compound I may be used in methods of treating or preventing a disease or condition characterized by aberrant plasma kallikrein activity. The method includes the step of administering to a subject in need thereof a therapeutically effective amount of Compound I, thereby treating or preventing the disease or condition characterized by aberrant plasma kallikrein activity. By reducing plasma kallikrein activity in the subject, the disease or condition characterized by aberrant plasma kallikrein activity is treated.

The terms "treat," "treating," and "treatment" as used herein means prevent, halt or slow the progression of, or eliminate a disease or condition in a subject. In some embodiments "treat," "treating," and "treatment" means halt or slow the progression of, or eliminate a disease or condition in a subject. In some embodiments, "treat," "treating," and "treatment" means reducing at least one objective manifestation of a disease or condition in a subject.

The term "effective amount" as used herein refers to an amount that is sufficient to bring about a desired biological effect.

The term "therapeutically effective amount" as used herein refers to an amount that is sufficient to bring about a desired therapeutic effect.

The term "inhibit" as used herein means decrease by an objectively measurable amount or extent. In various embodiments "inhibit" means decrease by at least 5, 10, 20, 30, 40, 50, 60, 70, 80, 90, or 95 percent compared to relevant control. In one embodiment "inhibit" means decrease 100 percent, i.e., halt or eliminate.

The term "subject" as used herein refers to a mammal. In various embodiments, a subject is a mouse, rat, rabbit, cat, dog, pig, sheep, horse, cow, or non-human primate. In one embodiment, a subject is a human.

Alternatively, in certain aspects, Compound I may be used for treatment of a disease or condition characterized by aberrant plasma kallikrein activity.

Alternatively, in certain aspects, Compound I may be used for the manufacture of a medicament for use in treatment of a disease or condition characterized by aberrant plasma kallikrein activity.

As used herein, a "disease or condition characterized by aberrant plasma kallikrein activity" refers to any disease or condition in which it is desirable to reduce plasma kallikrein activity. For example, it may be desirable to reduce plasma kallikrein activity in the setting of inappropriate activation or hyperactivation of kallikrein. As another example, it may be desirable to reduce plasma kallikrein activity in the setting of a hypercoagulable state. As another example, it may be desirable to reduce plasma kallikrein activity in the setting of tissue ischemia that is associated with the presence or formation of thrombus.

In certain embodiments, the disease or condition characterized by aberrant plasma kallikrein activity is selected from the group consisting of stroke, inflammation, reperfusion injury, acute myocardial infarction, deep vein thrombosis, post fibrinolytic treatment condition, angina, edema, angioedema, hereditary angioedema, sepsis, arthritis, hemorrhage, blood loss during cardiopulmonary bypass, inflammatory bowel disease, diabetes mellitus, retinopathy, diabetic retinopathy, diabetic macular edema, diabetic macular degeneration, age-related macular edema, age-related macular degeneration, proliferative retinopathy, neuropathy, hypertension, brain edema, increased albumin excretion, macroalbuminuria, and nephropathy.

In certain embodiments, the disease or condition characterized by aberrant plasma kallikrein activity is angioedema.

In certain embodiments, the disease or condition characterized by aberrant plasma kallikrein activity is acquired angioedema or hereditary angioedema (HAE).

Acquired Angioedema (AAE) (Caldwell J R, et al. Clin Immunol Immunopathol. 1972; 1:39-52) is characterized in several ways, including by acquired deficiency of C1 inhibitor (C1-INH), hyperactivation of the classical pathway of human complement and angioedema symptoms mediated by bradykinin released by inappropriate activation of the contact-kinin system. AAE may be present in two forms, AAE type I (which is normally associated with another disease) and AAE type II, which is normally associated with an autoimmune disease. AAE may be caused by a number of factors, including, but not limited to, autoimmune diseases (for example, the production of anti-C1INH antibodies) or by an acquired mutation in C1 INH. Furthermore, Compound I may be used to treat side effects of angiotensin converting enzyme (ACE) inhibitor treatments. ACE inhibitors block the major pathway for breakdown of bradykinin. Inhibiting kallikrein formation through the use of Compound I reduces the formation of bradykinin.

In certain embodiments, the disease or condition characterized by aberrant plasma kallikrein activity is hereditary angioedema (HAE). In certain embodiments, the hereditary angioedema is Type I hereditary angioedema. Alternatively, the hereditary angioedema may be Type II hereditary angioedema. Alternatively, the hereditary angioedema may be Type III hereditary angioedema.

In certain embodiments, Compound I is used for prophylactic treatment of HAE. In other embodiments, Compound I is used for acute treatment of HAE.

In certain embodiments, Compound I is used for the prevention or treatment of angioedema attacks in a subject with HAE. In certain embodiments, Compound I is used as a preventive treatment to reduce the frequency of angioedema attacks in a subject with HAE. In other embodiments, Compound I is used for the treatment of an acute angioedema attack in a subject with HAE.

In certain embodiments, the disease or condition characterized by aberrant plasma kallikrein activity is stroke.

In certain embodiments, the disease or condition characterized by aberrant plasma kallikrein activity is reperfusion injury.

In certain embodiments, the disease or condition characterized by aberrant plasma kallikrein activity is acute myocardial infarction.

In certain embodiments, the disease or condition characterized by aberrant plasma kallikrein activity is hemorrhage.

In certain embodiments, the disease or condition characterized by aberrant plasma kallikrein activity is blood loss during cardiopulmonary bypass.

In certain embodiments, the disease or condition characterized by aberrant plasma kallikrein activity is selected from the group consisting of retinopathy, diabetic retinopathy, diabetic macular edema, diabetic macular degeneration, age-related macular edema, age-related macular degeneration, and proliferative retinopathy.

Formulations, Routes of Administration, and Dosing

Compound I, synthesized as described herein, can be formulated as pharmaceutical compositions and administered to a mammalian host, such as a human patient, in a variety of forms adapted to the chosen route of administration, e.g., orally or parenterally, by intravenous, intraperitoneal, intramuscular, topical, or subcutaneous routes. Additional routes of administration are also contemplated by the invention.

Thus, Compound I (also referred to herein as an "active compound") may be systemically administered, e.g., orally, in combination with a pharmaceutically acceptable vehicle such as an inert diluent or an assimilable edible carrier. They may be enclosed in hard or soft shell gelatin capsules, may be compressed into tablets, or may be incorporated directly with the food of the patient's diet. For oral therapeutic administration, the active compound may be combined with one or more excipients and used in the form of ingestible tablets, buccal tablets, troches, capsules, elixirs, suspensions, syrups, wafers, and the like. Such compositions and preparations should contain at least 0.1% of active compound. The percentage of the compositions and preparations may, of course, be varied and may conveniently be between about 2% to about 60% of the weight of a given unit dosage form. The amount of active compound in such therapeutically useful compositions is such that an effective dosage level will be obtained.

The tablets, troches, pills, capsules, and the like may also contain the following diluents and carriers: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring may be added. When the unit dosage form is a capsule, it may contain, in addition to materials of the above type, a liquid carrier, such as a vegetable oil or a polyethylene glycol. Various other materials may be present as coatings or to otherwise modify the physical form of the solid unit dosage form. For instance, tablets, pills, or capsules may be coated with gelatin, wax, shellac or sugar and the like. A syrup or elixir may contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the active compound may be incorporated into sustained-release preparations and devices.

The active compound may also be administered intravenously or intraperitoneally by infusion or injection. Solutions of the active compound can be prepared in water or physiologically acceptable aqueous solution, optionally mixed with a nontoxic surfactant. Dispersions can also be prepared in glycerol, liquid polyethylene glycols, triacetin, and mixtures thereof and in oils. Under ordinary conditions of storage and use, these preparations contain a preservative to prevent the growth of microorganisms.

The pharmaceutical dosage forms suitable for injection or infusion can include sterile aqueous solutions or dispersions or sterile powders comprising the active compound which are adapted for the extemporaneous preparation of sterile injectable or infusible solutions or dispersions, optionally encapsulated in liposomes. In all cases, the ultimate dosage form should be sterile, fluid and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars, buffers or sodium chloride. Prolonged absorption of the injectable compositions can be brought about by the use in the compositions of agents delaying absorption, for example, aluminum monostearate and gelatin.

Sterile injectable solutions are prepared by incorporating the active compound in the required amount in the appropriate solvent with various of the other ingredients enumerated above, as required, followed by filter sterilization. In the case of sterile powders for the preparation of sterile injectable solutions, methods of preparation can include vacuum drying and the freeze drying techniques, which yield a powder of the active compound plus any additional desired ingredient present in the previously sterile-filtered solutions.

For topical administration, Compound I may be applied in pure form, i.e., when they are prepared in liquids. However, it will generally be desirable to administer them to the skin as compositions or formulations, in combination with a dermatologically acceptable carrier, which may be a solid or a liquid.

Useful solid carriers include finely divided solids such as talc, clay, microcrystalline cellulose, silica, alumina and the like. Useful liquid carriers include water, alcohols or glycols or water-alcohol/glycol blends, in which the Compound I can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user.

Examples of useful dermatological compositions which can be used to deliver Compound I to the skin are known in the art; for example, see Jacquet et al. (U.S. Pat. No. 4,608,392; incorporated herein by reference), Geria (U.S. Pat. No. 4,992,478; incorporated herein by reference), Smith et al. (U.S. Pat. No. 4,559,157; incorporated herein by reference), and Wortzman (U.S. Pat. No. 4,820,508; incorporated herein by reference).

Useful dosages of Compound I can be determined, at least initially, by comparing their in vitro activity and in vivo activity in animal models. Methods for the extrapolation of effective dosages in mice, and other animals, to humans are known in the art; for example, see U.S. Pat. No. 4,938,949 (incorporated herein by reference).

The amount of Compound I required for use in treatment will vary with the route of administration, the nature of the condition being treated, and the age and condition of the patient and will be ultimately at the discretion of the attendant physician or clinician.

In general, however, a suitable dose will be in the range of from about 0.5 to about 100 mg/kg body weight of the recipient per day, e.g., from about 3 to about 90 mg/kg of body weight per day, from about 6 to about 75 mg per kilogram of body weight per day, from about of 10 to about 60 mg/kg of body weight per day, or from about 15 to about 50 mg/kg of body weight per day.

Compound I can be conveniently formulated in unit dosage form; for example, containing 5 to 1000 mg, 10 to 750 mg, 50 to 500 mg, 75 mg to 350 mg, 75 mg to 300 mg, 75 mg to 250 mg, 75 mg to 200 mg, 75 mg to 175 mg, 75 mg to 150 mg, 75 mg to 125 mg, 100 mg to 750 mg, 100 mg to 500 mg, 100 mg to 350 mg, 100 mg to 300 mg, 100 mg to 250 mg, 100 mg to 200 mg, 100 mg to 175 mg, 100 mg to 150 mg, 100 mg to 125 mg, 125 mg to 350 mg, 125 mg to 300 mg, 125 mg to 250 mg, 125 mg to 200 mg, 125 mg to 175 mg, 125 mg to 150 mg, including, for example, 5 mg, 10 mg, 25 mg, 50 mg, 75 mg, 100 mg, 125 mg, 150 mg, 175 mg, 200 mg, 250 mg, 300 mg, 350 mg, 400 mg, 450 mg, 500 mg, 550 mg, 600 mg, 650 mg, 700 mg, 750 mg, 800 mg, 850 mg, 900 mg, 950 mg, 1000 mg, and other such unit dosages falling within the foregoing unit dosage ranges, of active compound per unit dosage form. In one embodiment, the invention provides a composition comprising Compound I formulated in such a unit dosage form. The desired dose may conveniently be presented in a single dose or as divided doses to be administered at appropriate intervals, for example, as two, three, four or more sub-doses per day. The sub-dose itself may be further divided, e.g., into a number of discrete loosely spaced administrations.

Compound I can also be administered in combination with other therapeutic agents, for example, other agents that are useful for treating or preventing ischemia, blood loss, or reperfusion injury.

Other delivery systems can include time-release, delayed release, or sustained release delivery systems such as are well-known in the art. Such systems can avoid repeated administrations of the active compound, increasing convenience to the subject and the physician. Many types of release delivery systems are available and known to those of ordinary skill in the art. Use of a long-term sustained release implant may be desirable. Long-term release, as used herein, means that the delivery system or is implant constructed and arranged to deliver therapeutic levels of the active compound for at least 30 days, and preferably 60 days.

In certain embodiments, Compound I is formulated for intraocular administration, for example direct injection or insertion within or in association with an intraocular medical device.

Compound I may be formulated for depositing into a medical device, which may include any of a variety of conventional grafts, stents, including stent grafts, catheters, balloons, baskets, or other device that can be deployed or permanently implanted within a body lumen. As a particular example, it would be desirable to have devices and methods which can deliver Compound I to the region of a body which has been treated by interventional technique.

In exemplary embodiments, Compound I may be deposited within a medical device, such as a stent, and delivered to the treatment site for treatment of a portion of the body.

Stents have been used as delivery vehicles for therapeutic agents (i.e., drugs). Intravascular stents are generally permanently implanted in coronary or peripheral vessels. Stent designs include those of U.S. Pat. No. 4,733,655 (Palmaz), U.S. Pat. No. 4,800,882 (Gianturco), or U.S. Pat. No. 4,886,062 (Wiktor). Such designs include both metal and polymeric stents, as well as self-expanding and balloon-expandable stents. Stents may also be used to deliver a drug at the site of contact with the vasculature, as disclosed in U.S. Pat. No. 5,102,417 (Palmaz), U.S. Pat. No. 5,419,760 (Narciso, Jr.), U.S. Pat. No. 5,429,634 (Narciso, Jr.), and in International Patent Application Nos. WO 91/12779 (Medtronic, Inc.) and WO 90/13332 (Cedars-Sanai Medical Center), for example.

The term "deposited" means that the active compound is coated, adsorbed, placed, or otherwise incorporated into the device by methods known in the art. For example, the compound may be embedded and released from within ("matrix type") or surrounded by and released through ("reservoir type") polymer materials that coat or span the medical device. In the latter example, the compound may be entrapped within the polymer materials or coupled to the polymer materials using one or more the techniques for generating such materials known in the art. In other formulations, the compound may be linked to the surface of the medical device without the need for a coating, for example by means of detachable bonds, and release with time or can be removed by active mechanical or chemical processes. In other formulations, the compound may be in a permanently immobilized form that presents the compound at the implantation site.

In certain embodiments, the active compound may be incorporated with polymer compositions during the formation of biocompatible coatings for medical devices, such as stents. The coatings produced from these components are typically homogeneous and are useful for coating a number of devices designed for implantation.

The polymer may be either a biostable or a bioabsorbable polymer depending on the desired rate of release or the desired degree of polymer stability, but frequently a bioabsorbable polymer is preferred for this embodiment since, unlike a biostable polymer, it will not be present long after implantation to cause any adverse, chronic local response. Bioabsorbable polymers that could be used include, but are not limited to, poly(L-lactic acid), polycaprolactone, polyglycolide (PGA), poly(lactide-co-glycolide) (PLLA/PGA), poly(hydroxybutyrate), poly(hydroxybutyrate-co-valerate), polydioxanone, polyorthoester, polyanhydride, poly(glycolic acid), poly(D-lactic acid), poly(L-lactic acid), poly(D, L-lactic acid), poly(D, L-lactide) (PLA), poly (L-lactide) (PLLA), poly(glycolic acid-co-trimethylene carbonate) (PGA/PTMC), polyethylene oxide (PEO), polydioxanone (PDS), polyphosphoester, polyphosphoester urethane, poly(amino acids), cyanoacrylates, poly(trimethylene carbonate), poly(iminocarbonate), copoly(ether-esters) (e.g., PEO/PLA), polyalkylene oxalates, polyphosphazenes and biomolecules such as fibrin, fibrinogen, cellulose, starch, collagen and hyaluronic acid, polyepsilon caprolactone, polyhydroxy butyric acid, polyorthoesters, polyacetals, polydihydropyrans, polycyanoacrylates, cross linked or amphipathic block copolymers of hydrogels, and other suitable bioabsorbable polymers known in the art. Also, biostable polymers with a relatively low chronic tissue response such as polyurethanes, silicones, and polyesters could be used, and other polymers could also be used if they can be dissolved and cured or polymerized on the medical device such as polyolefins, polyisobutylene and ethylene-alphaolefin copolymers; acrylic polymers and copolymers, vinyl halide polymers and copolymers, such as polyvinyl chloride; polyvinylpyrrolidone; polyvinyl ethers, such as polyvinyl methyl ether; polyvinylidene halides, such as polyvinylidene fluoride and polyvinylidene chloride; polyacrylonitrile, polyvinyl ketones; polyvinyl aromatics, such as polystyrene, polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; pyran copolymer; polyhydroxy-propyl-methacrylamide-phenol; polyhydroxyethyl-aspartamide-phenol; polyethyleneoxide-polylysine substituted with palmitoyl residues; polyamides, such as Nylon 66 and polycaprolactam; alkyd resins, polycarbonates; polyoxymethylenes; polyimides; polyethers; epoxy resins, polyurethanes; rayon; rayon-triacetate; cellulose, cellulose acetate, cellulose butyrate; cellulose acetate butyrate; cellophane; cellulose nitrate; cellulose propionate; cellulose ethers; and carboxymethyl cellulose.

Polymers and semipermeable polymer matrices may be formed into shaped articles, such as valves, stents, tubing, prostheses and the like.

In certain embodiments of the invention, Compound I is coupled to a polymer or semipermeable polymer matrix that is formed as a stent or stent-graft device.

Typically, polymers are applied to the surface of an implantable device by spin coating, dipping, or spraying. Additional methods known in the art can also be utilized for this purpose. Methods of spraying include traditional methods as well as microdeposition techniques with an inkjet type of dispenser. Additionally, a polymer can be deposited on an implantable device using photo-patterning to place the polymer on only specific portions of the device. This coating of the device provides a uniform layer around the device which allows for improved diffusion of various analytes through the device coating.

In certain embodiments of the invention, the active compound is formulated for release from the polymer coating into the environment in which the medical device is placed. Preferably, the compound is released in a controlled manner over an extended time frame (e.g., months) using at least one of several well-known techniques involving polymer carriers or layers to control elution. Some of these techniques are described in U.S. Patent Application 2004/0243225A1, the entire disclosure of which is incorporated herein in its entirety.

Moreover, as described for example in U.S. Pat. No. 6,770,729, which is incorporated herein in its entirety, the reagents and reaction conditions of the polymer compositions can be manipulated so that the release of the active compound from the polymer coating can be controlled. For example, the diffusion coefficient of the one or more polymer coatings can be modulated to control the release of the compound from the polymer coating. In a variation on this theme, the diffusion coefficient of the one or more polymer coatings can be controlled to modulate the ability of an analyte that is present in the environment in which the medical device is placed (e.g. an analyte that facilitates the breakdown or hydrolysis of some portion of the polymer) to access one or more components within the polymer composition (and for example, thereby modulating the release of the compound from the polymer coating). Yet another embodiment of the invention includes a device having a plurality of polymer coatings, each having a plurality of diffusion coefficients. In such embodiments of the invention, the release of the active compound from the polymer coating can be modulated by the plurality of polymer coatings.

In yet another embodiment of the invention, the release of the active compound from the polymer coating is controlled by modulating one or more of the properties of the polymer composition, such as the presence of one or more endogenous or exogenous compounds, or alternatively, the pH of the polymer composition. For example, certain polymer compositions can be designed to release a compound in response to a decrease in the pH of the polymer composition.

Kits

The invention also provides a kit, comprising a Compound I, at least one other therapeutic agent, packaging material, and instructions for administering Compound I and the other therapeutic agent or agents to a mammal to treat or prevent a disease or condition characterized by aberrant kallikrein activity in the mammal. In one embodiment, the mammal is a human.

EXAMPLES

Example 1: Synthetic Protocol for Compound A

The following scheme and accompanying steps set forth a protocol for synthesizing Compound A.

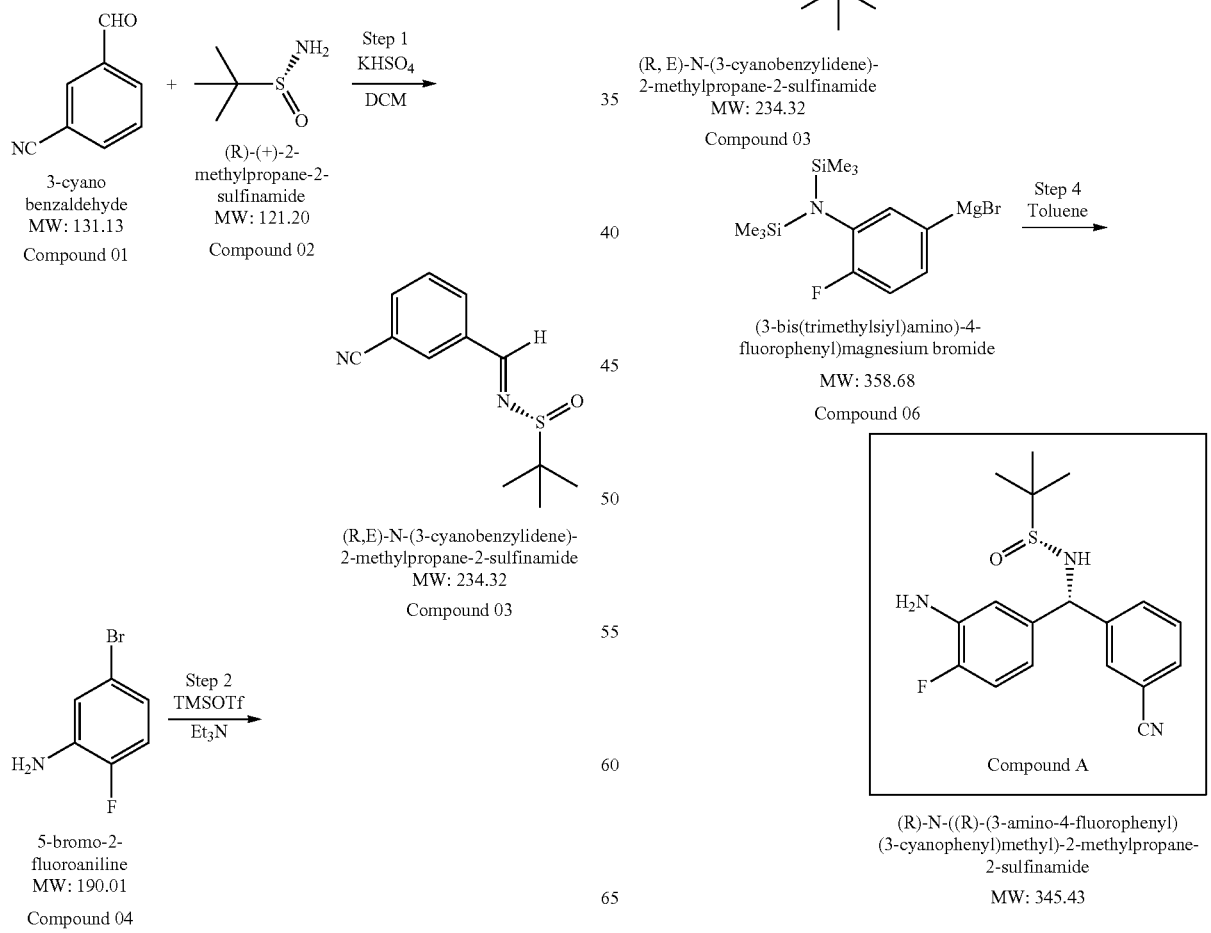

Step 1: (R,E)-N-(3-cyanobenzylidene)-2-methylpropane-2-sulfinamide (Compound 03)

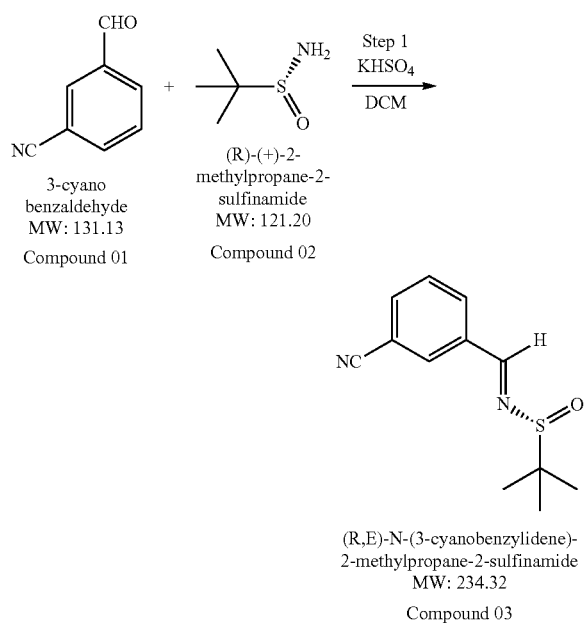

3-cyanobenzaldehyde (Compound 01; 53.57 kg, 408.42 mol, 0.9 equiv.) was added to a stirred solution of (R)-(+)-2-methylpropane-2-sulfinamide (Compound 02; 55.0 kg, 453.8 mol, 1.0 equiv.) in dichoromethane (DCM) (550.0 L, 10.0 vol) at room temperature. $KHSO_4$ (46.2 kg, 340.35 mol, 0.75 equiv.) was added at room temperature and reaction mixture was stirred for 6 h at this temperature. The progress of the reaction was monitored by HPLC analysis. The reaction mixture was quenched with water (220.0 L) and stirred for 30 min. DCM layer was separated and aqueous layer was again extracted with DCM (110.0 L). The combined organic extract was washed with sodium metabisulfite (17.24 kg in DMW (165.0 L)) for 2 h. The aqueous layer was extracted with DCM (55.0 L). The combined organic was dried over $Na_2SO_4$ (13.75 kg) and filtered. The filtrate was concentrated under reduce pressure at 40° C. Added n-heptane 110.0 L for crystallization, stir for 2 h at 10° C., filter and wash with n-heptane 27.5 L. Solid was dried in vacuum tray dryer at 35° C. to afford (R,E)-N-(3-cyanobenzylidene)-2-methylpropane-2-sulfinamide (Compound 03; 86.23 kg, 81.1%) as off white solid. $^1H$ NMR (300 MHz, DMSO-d6) δ 8.63 (s, 1H), 8.42 (d, J=1.7 Hz, 1H), 8.28 (dt, J=7.9, 1.4 Hz, 1H), 8.07 (dt, J=7.8, 1.4 Hz, 1H), 7.76 (t, J=7.8 Hz, 1H), 1.21 (s, 9H); MS (ES+) 235.2 (M+1), 257.2 (M+Na).

Step 2: N-(5-bromo-2-fluorophenyl)-1,1,1-trimethyl-N-(trimethylsilyl)silanamine

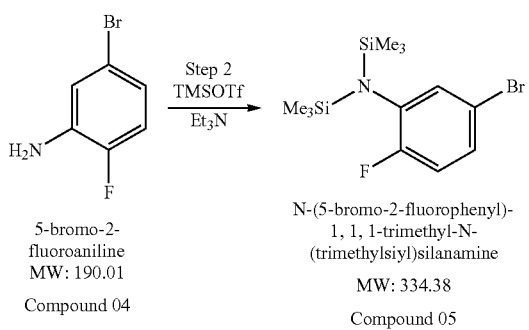 [SMILES: "Et3N" ; Nc1cc(Br)ccc1F ; C[Si](C)(C)N(c1cc(Br)ccc1F)[Si](C)(C)C]

Trimethylsilyltrifluoromethane sulfonate (55.1 kg, 249.98 mol) was added to a stirred solution of 5-bromo-2-fluoroaniline (Compound 04; 19.0 kg, 99.99 mol) in triethylamine (95.0 L) at room temperature under nitrogen. The reaction mixture was heated at reflux under nitrogen and stirred for 8-14 hours. The reaction progress was monitored by $^1H$ NMR. The reaction mixture was cooled to room temperature under nitrogen and allowed to stand to separate the layers. The lower layer was collected in separate HDPE drum under nitrogen. The upper layer was concentrated at 70° C. to 80° C. under reduce pressure. The residue was purified by HVD to afford the product N-(5-bromo-2-fluorophenyl)-1,1,1-trimethyl-N-(trimethylsilyl)silanamine (Compound 05) as light yellowish oil (29.09 kg, 86.99%).

Step 3: (3-(bis(trimethylsilyl)amino)-4-fluorophenyl)magnesium bromide

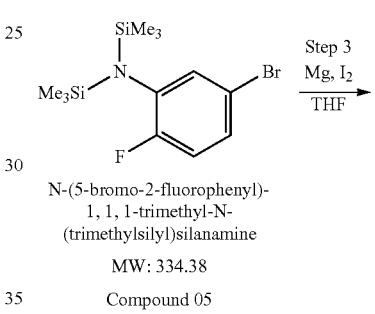

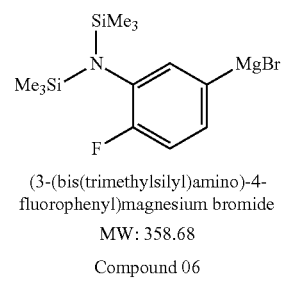

A suspension of oven dried Mg turnings (4.5 kg, 185.15 mol) in THF (15 L) and Iodine (50.50 g, 0.0013 equiv.) was stirred at room temperature for 10 minutes under nitrogen. N-(5-bromo-2-fluorophenyl)-1,1,1-trimethyl-N-(trimethylsilyl)silanamine (Compound 05) (1.5 kg, 4.49 mol) was added slowly to the above suspension at room temperature under nitrogen. An exothermic reaction was observed at the commencement of the initiation of the reaction. THF (100.0 L) was added to reaction under nitrogen. The remaining Compound 05 (48.5 kg, 145.04 mol) was added to the reaction mixture in such a rate that maintains the reaction temperature below 45° C. over a period of 5 to 7 h. The reaction mixture was stirred for 10 h at room temperature under nitrogen. The reaction mixture was used in next step as such. Qty: 150.0 L Step 4: (R)—N—((R)-(3-amino-4-fluorophenyl)(3-cyanophenyl)methyl)-2-methylpropane-2-sulfinamide (Compound A)

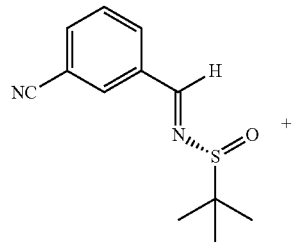

(R, E)-N-(3-cyanobenzylidene)-
2-methylpropane-2-sulfinamide
MW: 234.32
Compound 03

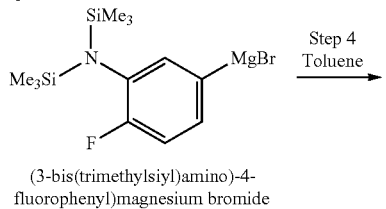

(3-bis(trimethylsiyl)amino)-4-
fluorophenyl)magnesium bromide
MW: 358.68
Compound 06

Step 4
Toluene
→

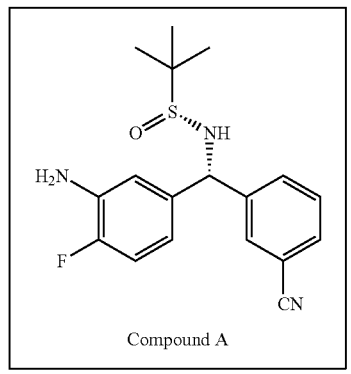

Compound A (R)-N-((R)-(3-amino-4-fluorophenyl)
(3-cyanophenyl)methyl)-2-methylpropane-
2-sulfinamide
MW: 345.43

A stirred solution of (R,E)-N-(3-cyanobenzylidene)-2-methylpropane-2-sulfinamide (Compound 03) (62.0 kg, 264.6 mol) in toluene (1240.0 L) was cooled to −60 to −50° C. The Grignard reagent solution (3-(bis(trimethylsilyl)amino)-4-fluorophenyl)magnesium bromide (Compound 06) (450.0 L) was added over a period of 2 h under nitrogen to maintain the reaction temperature between −60 to −35° C. The reaction mixture was stirred for 1 h at −60 to −35° C. under nitrogen and then was quenched with aqueous $KHSO_4$ solution (99.2 kg $KHSO_4$ in DM W 744 L) at −60 to 15° C., the mixture was stirred for 1 h at room temperature then allowed to stand to separate the layers. The lower aqueous layer was removed and was back extracted by toluene (341.0 L). The combined organic layers were washed by brine (105.4 kg NaCl in DM W 527.0 L). The organic layer was dried over $Na_2SO_4$ (43.4 kg) and filtered and the filtrate was concentrated under reduce pressure at 65° C. to afford crude Compound A (99.0 kg) as a sticky reddish crude.

The sticky reddish crude Compound A (99.1 kg) was dissolved in toluene (893.0 L) at 40-45° C. The solution was slowly cooled to room temperature. The solution was vigorously stirred and n-heptane (347.2 L) was added at room temperature. The mixture was stirred for 5 h at 15-20° C. and the precipitated solid was collected by filtration, washed with mixture of 20 parts of toluene to 80 parts of n-heptane (97.0 L) and dried at room temperature for 24 h to afford the product as light brown solid (40.36 kg, 44.16%). mp 100.6° C.

Step 5: Recrystallization of (R)—N—((R)-(3-amino-4-fluorophenyl)(3-cyanophenyl)methyl)-2-methylpropane-2-sulfinamide (Compound A)

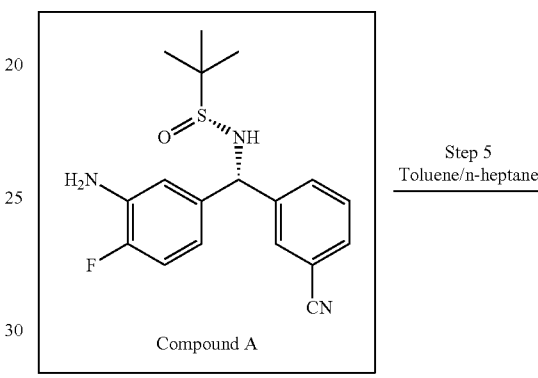

(R)-N-((R)-(3-amino-4-fluorophenyl)
(3-cyanophenyl)methyl)-2-methylpropane-
2-sulfinamide
MW: 345.43

Step 5
Toluene/n-heptane
→

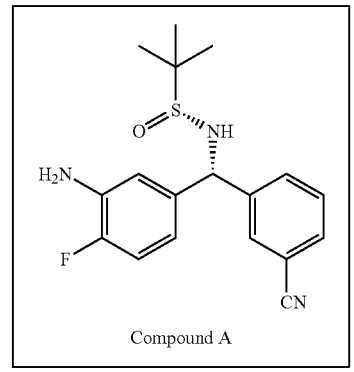

Compound A (R)-N-((R)-(3-amino-4-fluorophenyl)
(3-cyanophenyl)methyl)-2-methylpropane-
2-sulfinamide
MW: 345.43

(R)—N—((R)-(3-amino-4-fluorophenyl)(3-cyanophenyl)methyl)-2-methylpropane-2-sulfinamide (Compound A) (81.0 kg) was dissolved in toluene (567.0 L) at 40-50° C. The reaction mixture was cooled to room temperature and then filtered through hyflowbed, washed with toluene (162.0 L). The solution was charged into the reactor. The solution was vigorously stirred and n-heptane (324.0 L) was added at room temperature. The mixture was stirred for 5 h at 15-20° C. and the precipitated solid was collected by filtration, washed with mixture of 10 parts of toluene to 90 parts of n-heptane (81.0 L) and dried at room temperature for 24 h to afford the product (R)—N—((R)-(3-amino-4-fluorophenyl)(3-cyanophenyl)methyl)-2-methylpropane-2-sulfinamide (Compound A) as off white solid (67.96 kg, 83.9%). $^1$H NMR (300 MHz, DMSO-d6) δ 7.82 (d, J=1.7 Hz, 1H), 7.70 (ddt, J=8.1, 5.2, 1.4 Hz, 2H), 7.54 (t, J=7.7 Hz, 1H), 6.93 (dd, J=11.4, 8.3 Hz, 1H), 6.73 (dd, J=8.8, 2.3 Hz, 1H), 6.57 (ddd, J=8.4, 4.4, 2.2 Hz, 1H), 5.99 (d, J=6.0 Hz, 1H), 5.48 (d, J=6.0 Hz, 1H), 5.14 (s, 2H), 1.13 (s, 9H); MS (ES+) 346.3 (M+1).

Example 2: Synthetic Protocol for Compound I.2HCl

The following scheme and accompanying steps set forth a protocol for synthesizing the crystalline bis(hydrochloride) salt of Compound I.

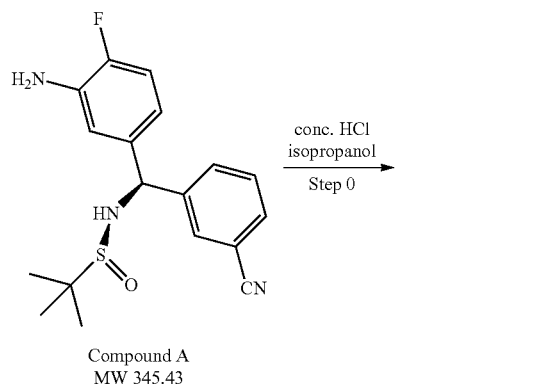

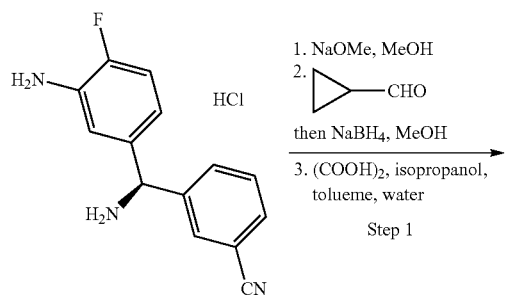

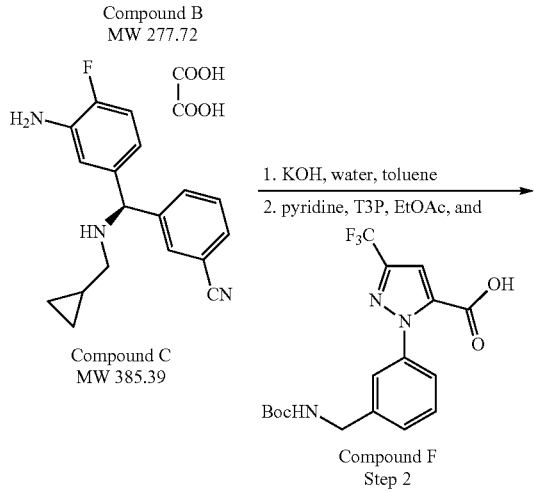

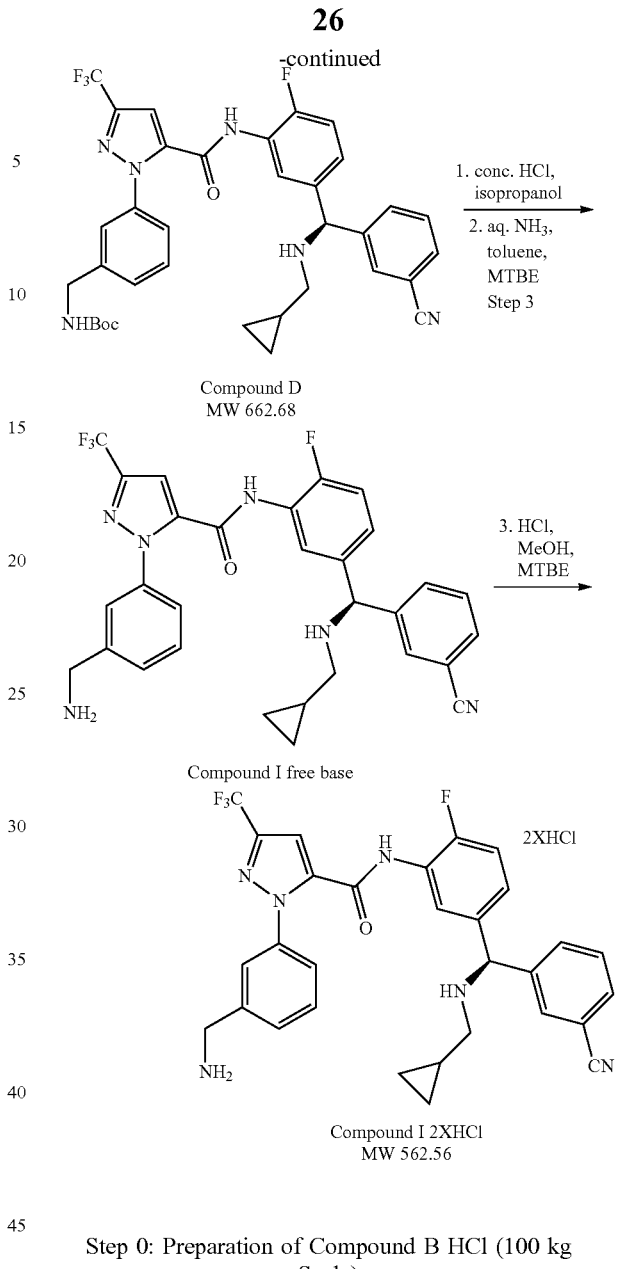

Step 0: Preparation of Compound B HCl (100 kg Scale)

Compound A (151 kg) and 2-propanol (501 L) were charged to a reactor and agitated at 35±5° C. until a clear solution was obtained. After temperature adjustment to 30-35° C., concentrated hydrochloric acid (37% aq, 64 kg, 1.5 equiv.) was transferred to the reactor over at least 10 minutes keeping the reactor temperature≤35° C. The temperature of the reactor content was adjusted to 25±5° C. and after 6±1 hours of agitation the content was cooled to 10±5° C. and an IPC sample was collected for conversion analysis by IPC HPLC. If the conversion to the reaction product, Compound B HCl, was <99.5%, the reaction mixture was reheated to 25±5° C. and agitated for another 3±1 hour and then again cooled to 10±5° C. and a new IPC sample was collected for analysis.

The content of the reactor was matured at 10±5° C. for 20-35 hours. The product slurry was transferred to centrifuge and the product was isolated by centrifugation and washed with 2-propanol. After dry spinning the product Compound B HCl, wet was discharged from the centrifuge.

The product was dried under vacuum at ≤30° C. for ≥3 hours and at ≤40° C. for ≥2 hours. Yield (~80%). ¹H NMR (300 MHz, DMSO-d6) δ 9.28 (s, 3H), 8.04 (s, 1H), 7.88-7.79 (m, 2H), 7.63 (t, J=7.8 Hz, 1H), 7.10-6.98 (m, 1H), 6.76 (d, J=10.3 Hz, 2H), 5.58 (s, 1H), 5.32 (s, 2H).

Step 1: Preparation of Compound C Oxalate (100 kg Scale)

Compound B HCl (94 kg) and methanol (412 L) were charged to a reactor and content temperature was adjusted to −10±5° C. 30% sodium methoxide in methanol (46 kg, 0.76 equiv.) was charged keeping the inner reactor temperature at −10±5° C. The reaction mixture was agitated for ≥60 min and the pH was checked, and further adjusted, as needed, to pH=7-8 using an optional portion of 30% sodium methoxide in methanol (2.6 kg, 0.04 equiv.). The reaction mixture was cooled to −22±4° C., and pre-weighed cyclopropane carboxaldehyde (23.4 kg, 0.99 equiv.) was charged in five portions keeping the reactor inner temperature≤−10° C. The reactor content was then agitated for ≥1.5 hours at temperature −20±5° C.

Sodium borohydride (4.5 kg, 0.35 equiv.) was charged one portion at a time keeping the reactor temperature −20±5° C. The reactor content was then agitated for ≥30 min at temperature −20±5° C., and IPC assayed for conversion to Compound C. An optional portion of sodium borohydride (0.32 kg, 0.025 equiv.) was charged, if needed, followed by agitation of the reactor content for 30 min at −20±5° C. When the reaction was completed (conversion to Compound C≥95.0%), vacuum distillation of methanol was performed at jacket temperature≤50° C. until the volume criteria (approx. 213 L) was reached. Extraction with toluene (339 L) and process water (121 L) was performed at inner temperature 30±5° C. followed by separation for ≥15 min. The lower water phase was discarded. 10% sodium chloride (99 kg) and process water (121 L) were premixed and then charged to the reactor at 30±5° C. followed by separation for ≥15 min. The lower water phase was discarded. The process continued with vacuum distillation of toluene, jacket temperature≤50° C., to the specified volume criteria (approx. 221 L).

Oxalic acid dihydrate (42 kg, 1 equiv.) and 2-propanol (254 L) were charged to a reactor and the content temperature was adjusted to 30±5° C. The content was then agitated for ≥30 min until a clear solution was obtained. The concentrated toluene phase from the above step was then transferred, and the reactor temperature was adjusted to 30±5° C. and agitated for ≥30 min and crystallization was checked. The reactor content was cooled to 20±5° C. and agitated for ≥6 hours. The precipitate product was transferred to centrifuge and washed with premixed toluene (59 L) and 2-propanol (62 L). After dry spinning the product Compound C oxalate, wet was discharged from the centrifuge. Recrystallization was performed by charging the entire discharged batch of Compound C oxalate wet to the reactor followed by charge of preheated (80-83° C.) 2-propanol (516 L) and toluene (348 L). The reactor content was quickly heated to 79±3° C. and agitated until a clear solution was obtained. Process water (6.1 L, 1 equiv.) was charged to the reactor content and the content was cooled to 20±3° C. and agitated for at least 12 hours until crystallization occurred. The product was isolated by centrifugation and washed with premixed isopropanol (62 L) and toluene (59 L). The product was discharged and IPC sampled, and the second recrystallization was performed in the same procedure as described earlier, and IPC sampled (Compound B≤0.05%, RRT 1.39≤1.04%). The product was dried first at ≤30° C. for ≥3 hours and then at ≤40° C. for ≥3 hours in a cone drier. The dried material was discharged, yielding Compound C oxalate (yield~77%). ¹H NMR (300 MHz, Deuterium Oxide) δ 7.77 (d, J=3.3 Hz, 2H), 7.73 (s, 1H), 7.58 (t, J=7.8 Hz, 1H), 7.11 (dd, J=10.9, 8.4 Hz, 1H), 6.98 (dd, J=8.2, 2.3 Hz, 1H), 6.86 (dt, J=7.0, 3.2 Hz, 1H), 5.51 (s, 1H), 2.88 (d, J=7.4 Hz, 2H), 1.03 (tq, J=7.9, 3.9, 3.0 Hz, 1H), 0.63 (d, J=7.7 Hz, 2H), 0.24 (p, J=5.5, 5.1 Hz, 2H).

Step 2: Preparation of Compound D (100 kg Scale; Toluene Solution 500 kg, 20 w/w % Compound D)

A premix of KOH solution was prepared by charging water (141 L) and Potassium hydroxide (24 kg, 85%, 2.1 equiv.). The mixture was agitated at 20±5° C. until a clear solution was obtained. Compound C oxalate (67 kg), 2-propanol (10 L) and toluene (292 L) were charged to a reactor and the reactor content was agitated at 20±5° C. for ≥15 min. The prepared Potassium hydroxide solution was transferred to another reactor at temperature≤50° C. The reaction mixture was then heated to 50±5° C. and agitated until a clear solution was obtained. The pH (≥13) of the lower aqueous phase was checked and the reactor content was then left to separate for ≥10 min, and the lower aqueous phase was discarded.

The remaining toluene phase was washed with process water (156 L) at 50±5° C. and separated for ≥15 min followed by removal of the lower aqueous phase. The procedure was repeated, and the organic phase was IPC sampled (RRT 0.85, NMT 0.10%). The toluene phase was distilled under vacuum at jacket temperature≤70° C. to the specified volume (173 L). Toluene (192 L) was charged, and the distillation was repeated in the same procedure.

To another reactor, Compound F (73.5 kg as 100%, 1.1 equiv.) was charged via the manhole and the reactor was agitated at 20±5° C. for ≥15 min and the first portion of pyridine (13.7 kg, 1.0 equiv.) was charged. The content was then agitated until a clear solution was obtained.

T3P, 50% in EtOAc (148.7 kg, 50%, 1.35 equiv.) was charged to the above solution at temperature≤3° C. The content in the reactor was heated to 20±5° C. and the mixture agitated for 1.5-2.5 hours, and then a second portion of pyridine (6.9 kg, 0.5 equiv.) was charged. After agitation of the content for 2-4 hours at 20±5° C., the reaction mixture (containing both water and organic phase) was IPC sampled for conversion analysis (Compound D≥99.6%). Process water (265 L) and the third portion of pyridine (20.6 kg) were charged to the reactor. The reaction mixture was agitated at 35-40° C. for 15 min and was then separated for ≥20 min and the lower aqueous phase was discarded. The organic phase was washed with process water (265 L) and agitated at 35-40° C. for ≥15 min and then left to separate for ≥20 min followed by removal of the lower aqueous phase. The procedure was repeated as needed. A premixed solution of aqueous Sodium bicarbonate (5%), water (487 L) and NaHCO₃ (24.8 kg, 1.7 equiv.) was then transferred, and the content was agitated at 38±3° C. for ≥20 min and separated for ≥20 min and the lower aqueous phase was discarded. The process continued with washing with process water (266 L) of the content at 35-40° C. in the reactor followed by separation and removal of the lower aqueous phase.

Distillation under vacuum of the reactor content was performed at Tm<70° C. to a volume of <284 L in the reactor. Toluene (approx. 280 L) was charged to reach the specified target volume (approx. 563 L). The product (Compound D) solution was cooled to 4±5° C., sampled and discharged to a barrel flushed with nitrogen and then stored in a cooling container at 4±5° C. $^1$H NMR (300 MHz, DMSO-d6) δ 10.56 (s, 1H), 7.89 (t, J=1.6 Hz, 1H), 7.74 (d, J=7.7 Hz, 1H), 7.69-7.61 (m, 2H), 7.58 (s, 1H), 7.54-7.31 (m, 7H), 7.22 (dd, J=10.3, 8.5 Hz, 1H), 4.93 (s, 1H), 4.19 (d, J=6.2 Hz, 2H), 2.25 (s, 2H), 1.37 (s, 9H), 1.26 (s, 1H), 1.00-0.80 (m, 1H), 0.48-0.30 (m, 2H), 0.10--0.03 (m, 2H); $^{19}$F NMR (282 MHz, DMSO) ä −60.62, −123.00; MS (ES+) 663.5 (M+1).

Step 3: Preparation of Compound I 2×HCl (100 kg Scale)

To a reactor, Compound D (119.9 kg, as 614.7 kg, 19.5% toluene solution) was charged and the solution was vacuum distilled at jacket temperature≤70° C. for removal of toluene until volume content of 283 L was reached. Solvent exchange was performed by charging 2-propanol (807 L) to the reactor followed by vacuum distillation at Tm<70° C. until volume content of 283 L was reached. The procedure was repeated once, and the distilled solution was then diluted with 2-propanol (306 L) and water (542 L), and temperature adjusted to 20±5° C. 37% Hydrochloric acid (115.2 kg; 6.46 equiv.) was charged to the reactor keeping the reactor inner temperature≤45° C. The reaction mixture was then agitated at 40-47° C. for 5-12 hours and then IPC sampled for conversion control (Compound I≥98%). The content of the reactor was washed with toluene (420 L) and agitated for at least 15 min at 35-40° C., followed by separation of the product phase (lower aqueous phase)≥15 min at 35-40° C. The organic waste phase (upper phase) was discarded. This procedure was repeated two times (first with 540 L toluene, then with 633 L toluene). Toluene (662 L) was charged to the aqueous product phase and 25% aqueous ammonia (137 kg, 11.2 equiv.) was charged to the reactor via glass vessel at temperature≤40° C., and the basic mixture agitated for at least 30 min at 35-40° C., and the pH checked (pH≥10), followed by cessation of agitation to allow separation of a lower aqueous phase and upper organic phase containing the product Compound I free base. The lower aqueous phase was discarded. The organic product phase was washed with process water (614 L) at temperature 35-40° C. and the aqueous phase was discarded. This procedure was repeated once. The toluene phase was distilled under vacuum at jacket temperature≤70° C. to specified volume (314 L) in the reactor. Solvent exchange to MTBE (627 L) was carried out under vacuum distillation at Tm<70° C. The procedure was repeated once and the remaining content in the reactor was adjusted by further addition of MTBE or further distillation to obtain specified volume (maximum 1372 L, minimum 1262 L) controlled at 20±5° C. The content was then cooled to −7±3° C.

37% aqueous hydrochloric acid (38.1 kg, 32.3 L, 2.14 equiv.) was charged to a clean and empty crystallization vessel, a methanol (228.9 kg, 39.5 equiv.) rinse added, and the content cooled to −7±3° C. The MTBE phase from the previous step was filtrated via a polish filter to the crystallization vessel at temperature −5±5° C. After rinse with MTBE, pre-weighed Compound I 2×HCl seeds (1.39 kg, 0.012 equiv.) were charged via the manhole. The vessel content was heated to 30-33° C. and the agitation speed was set to 25-50 rpm. After confirmed crystallization, the slurry was agitated for another three to four hours. The product slurry was transferred to centrifuge and was isolated by centrifugation and the product was washed with MTBE (585 L). After dry spinning the product Compound I 2×HCl, wet was discharged from the centrifuge and the product was dried at ≤40° C. under vacuum in a cone drier. Typical yield=74-86%.

$^1$H NMR (300 MHz, DMSO-d6) data is shown in the following table:

| Structure | Chemical Shift (ppm) | Class | Number of Hydrogens |
|---|---|---|---|
| | 0.02-0.10 | m | 2 |
| | 0.33-0.42 | m | 2 |
| | 0.80-0.97 | m | 1 |
| | 2.21-2.31 | m | 2 |
| | 3.77 | s | 2 |
| | 4.93 | s | 1 |
| | 7.22 | dd | 1 |
| | 7.34 | ddt | 2 |
| | 7.38-7.47 | m | 2 |
| | 7.47-7.54 | m | 2 |
| 2XHCl | 7.56 | s | 1 |
| | 7.63 | dd | 1 |
| | 7.67 | dt | 1 |
| | 7.71-7.77 | m | 1 |
| | 7.88 | t | 1 |
| | 10.53 | s | 1 |

$^{19}$F NM/R (282 MHz, DMSO-d6) data is shown in the following table:

| Structure | Fluorine Chemical Shifts (ppm) |
|---|---|
| 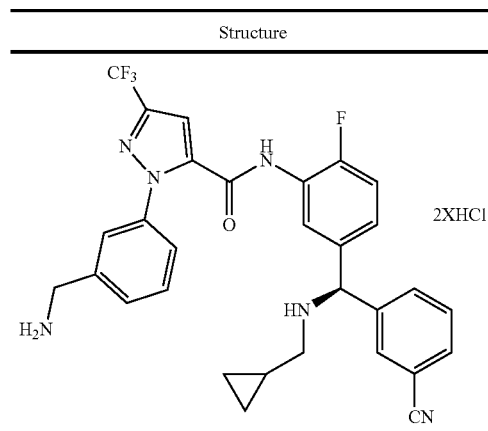 | −60.81, −119.99 |

Compound I has two basic sites. The conjugate acid of the primary amine was calculated to have a pKa value of 8.89, and the conjugate acid of the secondary amine was calculated to have a pKa value of 7.86.

Example 3: Compound Assays

Compound I was assayed in an in vitro biochemical assay measuring inhibition of human plasma kallikrein activity. Experimental protocols and results of the assays are found in WO 2015/134998 and U.S. Patent Application Publication No. 2017/0073314 A1 (both incorporated by reference). Results of this biochemical assay demonstrate that Compound I is a potent inhibitor of human plasma kallikrein activity.

INCORPORATION BY REFERENCE

All U.S. patents and U.S. and PCT published patent applications mentioned herein are hereby incorporated by reference in their entirety as if each individual patent or published application was specifically and individually indicated to be incorporated by reference. In case of conflict, the present application, including any definitions herein, will control.

EQUIVALENTS

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

We claim:

1. A method, comprising the step of:

combining compound C, or a salt thereof, and compound F, or a salt thereof, under conditions sufficient to produce compound D, or a salt thereof, wherein:

compound C is represented by:

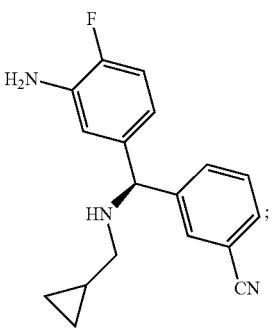 [SMILES: N#Cc1cccc([C@@H](NCC2CC2)c2ccc(F)c(N)c2)c1]

compound F is represented by:

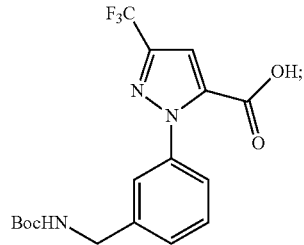 [SMILES: CC(C)(C)OC(=O)NCc1cccc(-n2nc(C(F)(F)F)cc2C(=O)O)c1]

and compound D is represented by:

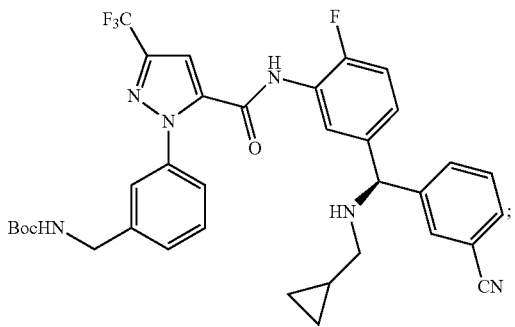 [SMILES: CC(C)(C)OC(=O)NCc1cccc(-n2nc(C(F)(F)F)cc2C(=O)Nc2cc([C@H](NCC3CC3)c3cccc(C#N)c3)ccc2F)c1]

wherein:
  the conditions sufficient to produce compound D comprise an amide-coupling reagent, and a base A;
  the amide-coupling reagent is propylphosphonic anhydride (T3P), N,N'-di (isopropyl) carbodiimide, N,N'-di (cyclohexyl) carbodiimide, 1-ethyl-3-(3-dimethylaminopropyl) carbodiimide, or ethyl 2-cyano-2-(hydroxyimino) acetate;
  the base A is triethylamine, pyridine, diisopropylethylamine, diisopropylmethylamine, imidazole, pyrimidine, N-methylmorpholine, quinuclidine, or 1,4-diazabicyclo [2.2.2]octane (DABCO); and
  compound C is used in an amount of at least 1 kg.

2. The method of claim 1, wherein the amide-coupling reagent is propylphosphonic anhydride (T3P).

3. The method of claim 1, wherein the base A is pyridine.

4. The method of claim 1, wherein the conditions sufficient to produce compound D further comprise a solvent A.

5. The method of claim 4, wherein the solvent A is a polar aprotic solvent.

6. The method of claim 5, wherein the solvent A is dichloromethane, tetrahydrofuran, acetone, acetonitrile, or ethyl acetate.

7. The method of claim 1, wherein compound C is present as an acid salt; and
  the method further comprises the step of combining the acid salt of compound C with an aqueous base B, thereby forming the free base of compound C;
  wherein the step of combining the acid salt of compound C with the aqueous base B occurs before combining compound C and compound F.

8. The method of claim 7, wherein the acid salt of compound C is a hydrochloride salt, a hydrobromide salt, a hydroiodide salt, or an oxalic acid salt.

9. The method of claim 1, further comprising (a) combining compound B, or a salt thereof, and

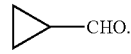CHO to form a reaction mixture A, then (b) combining the reaction mixture A with a reducing agent under conditions sufficient to form compound C, or a salt thereof, wherein:
  compound B is represented by:

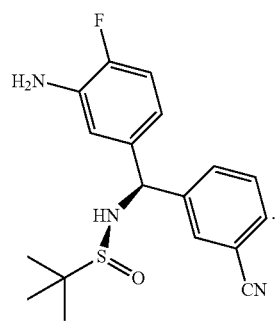

10. The method of claim 9, wherein the reducing agent is LiAlH₄ or NaBH₄.

11. The method of claim 9, further comprising contacting compound C with an acid A to form an acid salt of compound C.

12. The method of claim 11, wherein the acid A is hydrochloric acid, hydrobromic acid, hydroiodic acid, or oxalic acid; and the acid salt of compound C is a hydrochloride salt, a hydrobromide salt, a hydroiodide salt, or an oxalic acid salt.

13. The method of claim 9, wherein compound B is present as an acid salt; and
  the method further comprises the step of combining the salt of compound B with an organic base C, thereby forming the free base of compound B;
  wherein the step of combining the salt of compound B with the organic base C occurs before combining compound B and

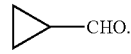CHO.

14. The method of claim 9, further comprising (a) combining compound A and an acid B under conditions sufficient to form compound B, or a salt thereof; wherein:
  compound A is represented by:

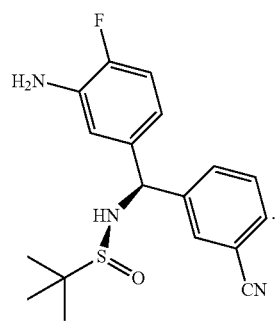

15. The method of claim 14, wherein the acid B is hydrochloric acid, hydrobromic acid, or hydroiodic acid.

16. The method of claim 14, wherein compound B is formed as an acid salt.

17. The method of claim 1, further comprising (e) combining compound D and a deprotecting reagent to form a reaction mixture B, then (d) exposing the reaction mixture B to conditions sufficient to form Compound I as a free base; wherein:
  Compound I is represented by:

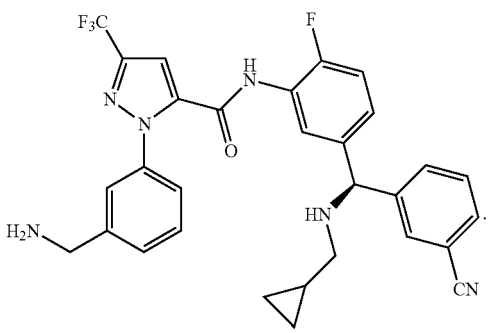 [SMILES: N#Cc1cccc([C@@H](NCC2CC2)c2ccc(F)c(NC(=O)c3cc(C(F)(F)F)nn3-c3cccc(CN)c3)c2)c1]

18. The method of claim 17, further comprising:
  i) providing a first freebase mixture of Compound I as a free base in an organic solvent D, thereby forming a freebase mixture;
  ii) combining the freebase mixture with a reagent solution A comprising an acid D and an organic solvent E under conditions sufficient to form a reaction mixture C comprising a salt of Compound I; and iii) isolating a crystalline salt of Compound I from the reaction mixture C comprising the salt of Compound I.

19. The method of claim 18, wherein the crystalline salt is a hydrochloride salt.

20. The method of claim 18, wherein the crystalline salt is a bis (hydrochloride) salt.

21. The method of claim 1, wherein compound C is used in an amount of at least 5 kg, at least 10 kg, at least 15 kg, at least 20 kg, at least 25 kg, at least 30 kg, at least 35 kg, at least 40 kg, at least 45 kg, at least 50 kg, at least 55 kg, or at least 60 kg.

22. The method of claim 1, wherein compound C is used in an amount of at least 50 kg.

* * * * *